United States Patent Office 2,821,090
Patented Jan. 28, 1958

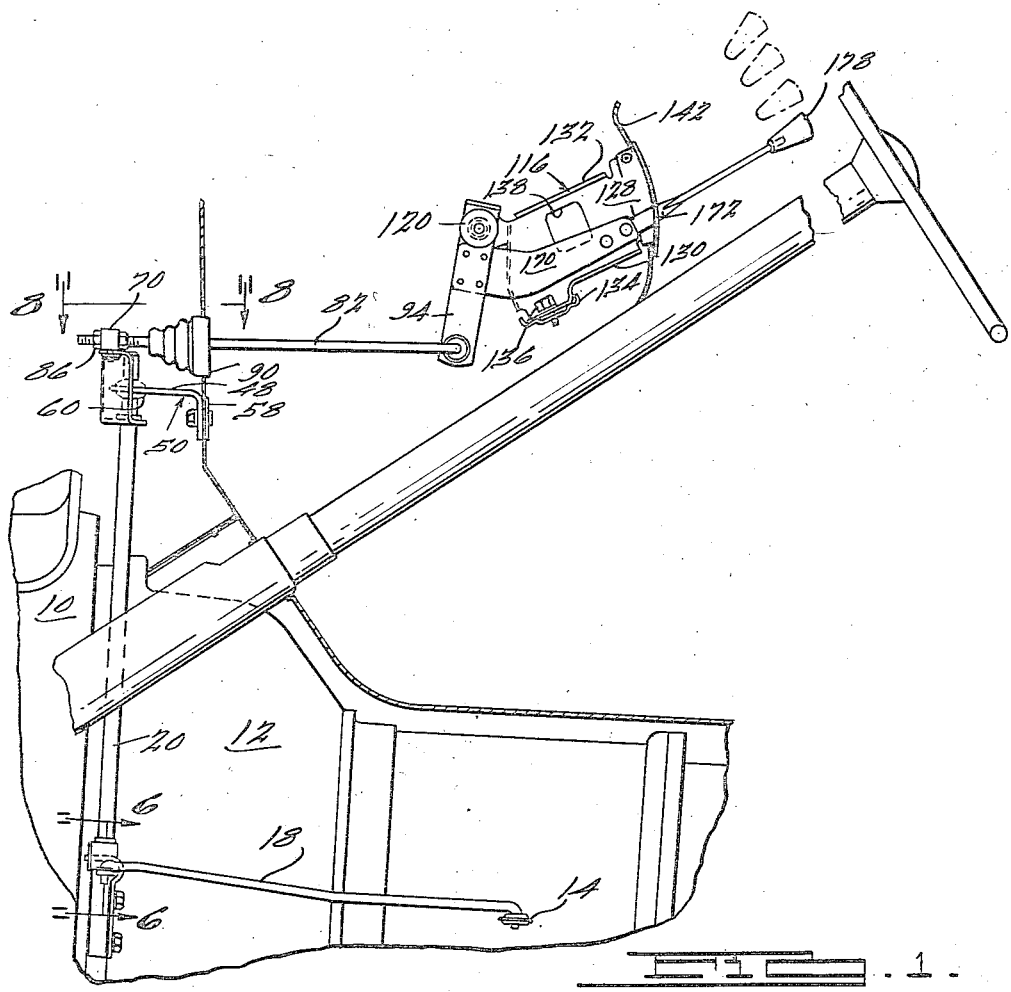
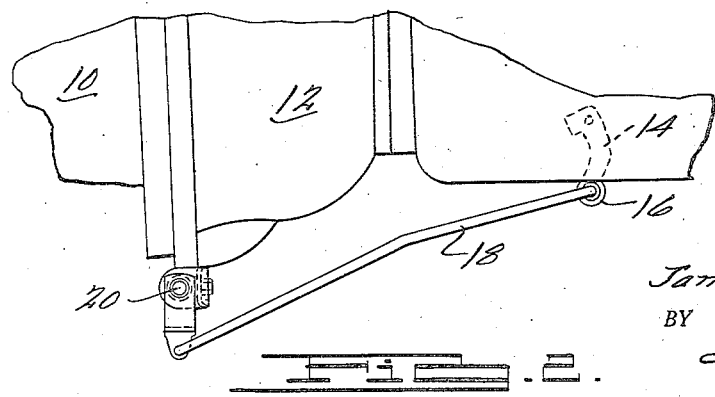

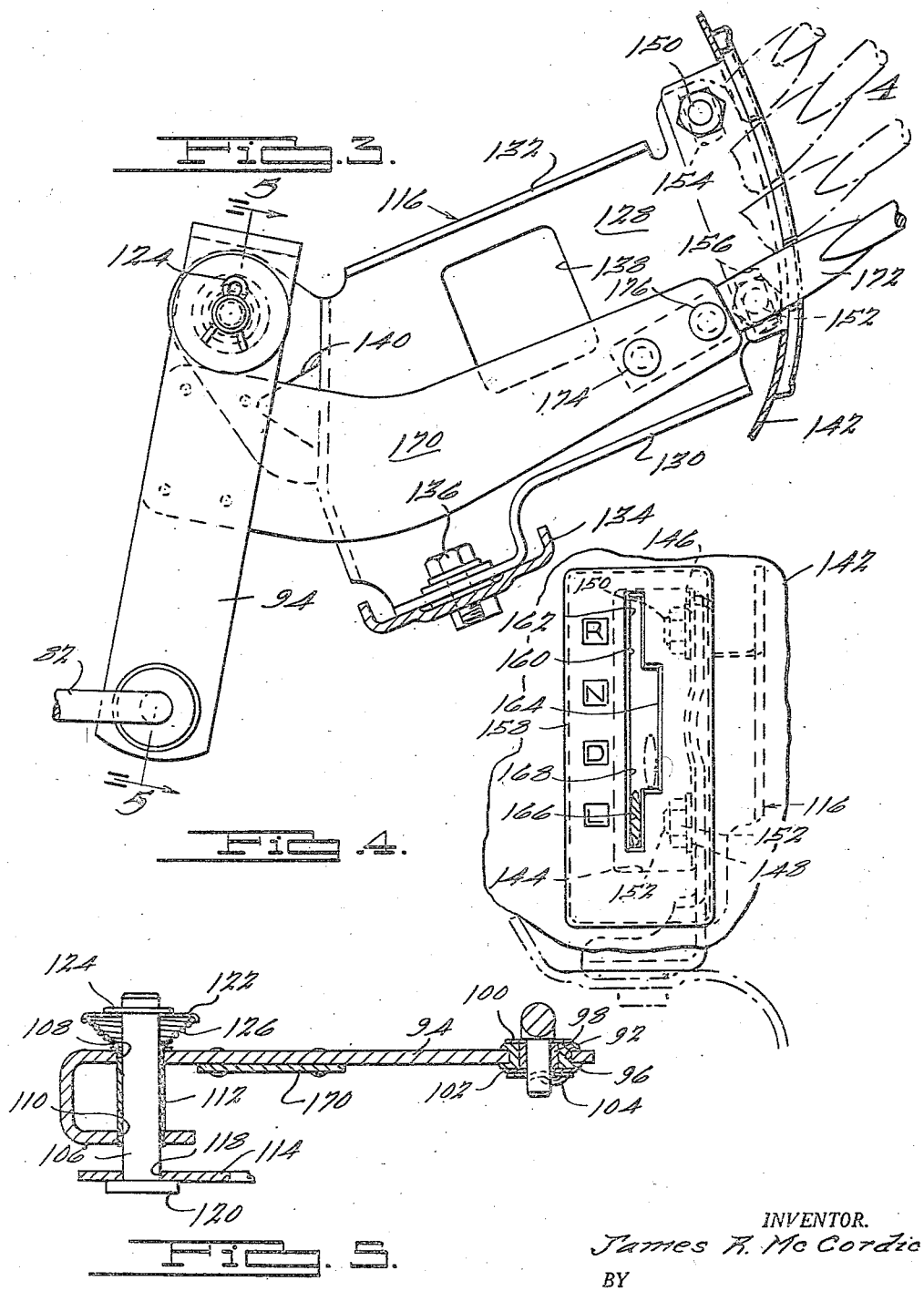

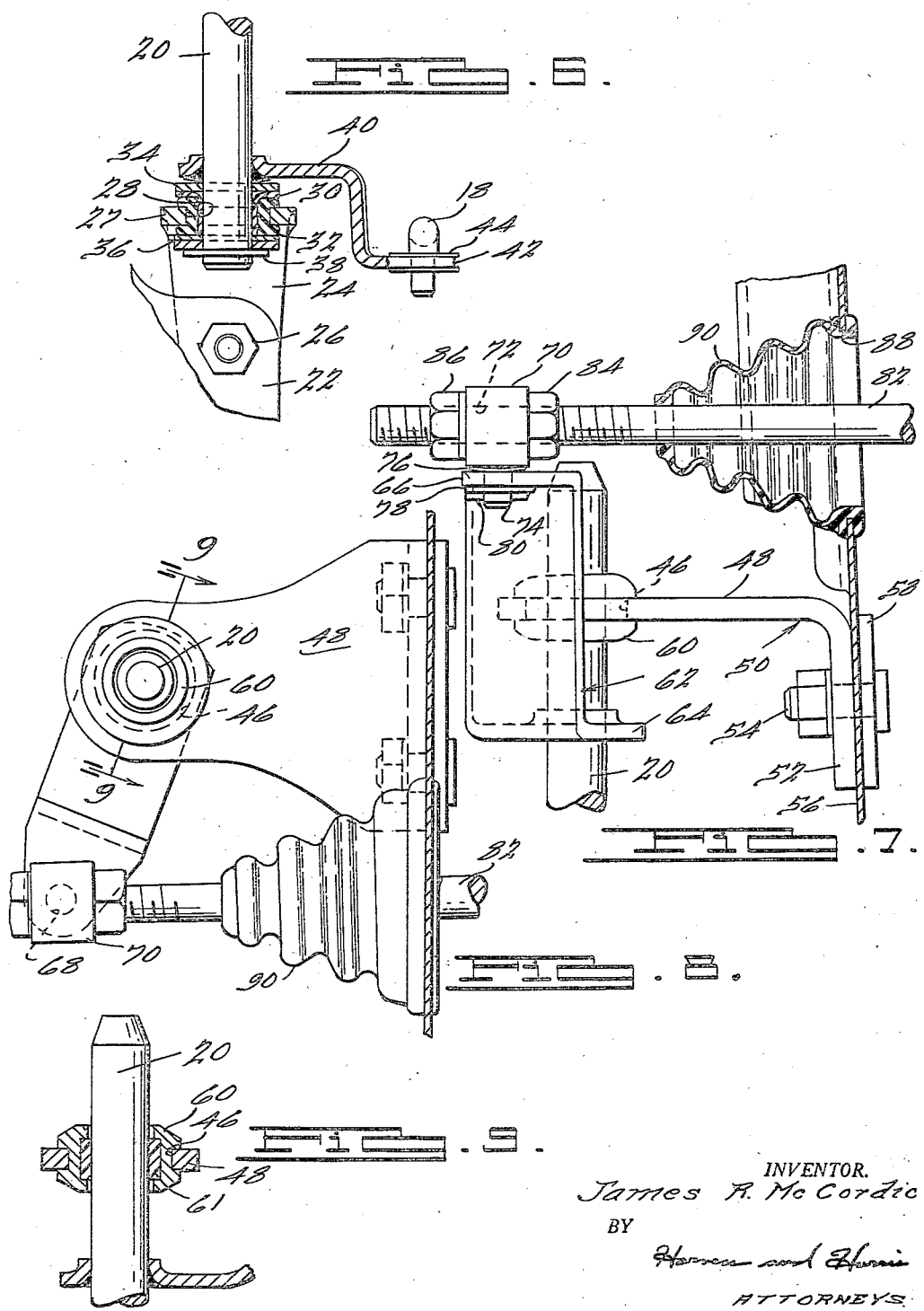

2,821,090

TRANSMISSION GEARSHIFT CONTROL MECHANISM

James R. McCordic, Royal Oak, Mich., assignor to Chrysler Corporation, Highland Park, Mich., a corporation of Delaware Application August 9, 1955, Serial No. 527,250

7 Claims. (Cl. 74—473)

My invention relates generally to motion transmitting linkage mechanisms and more particularly to an improved mechanical linkage arrangement which is especially adapted to be applied to a multiple gear ratio power transmission for manually selecting the desired operating speed ratio.

Although the principles of my invention may be conveniently applied to a variety of linkage arrangements, my invention finds particular utility as an automotive vehicle transmission control mechanism and it is characterized by a novel manually operable lever which forms a portion of the mechanism and which is pivotally mounted within the vehicle passenger compartment on the interior dash structure.

My invention represents an improvement in the transmission shift control mechanism disclosed in the copending application of Alan G. Loofbourrow, Serial No. 441,905, which is assigned to the assignee of my instant invention. The shift mechanism of this copending application includes a manually operable transmission selector lever mounted on the vehicle dash structure, and the end of the lever extends through a gate opening in the dash cover to facilitate manual movement of the same about its pivot point. A novel linkage arrangement is provided for transferring the motion of the manually operable lever to the shift control portion of the transmission. The gate structure comprises a series of stops which are formed within the elongated gate opening and which are engaged by the manually operable selector lever as the latter is moved from one position to the other, one stop corresponding to each transmission driving range.

The structure of my present invention includes linkage elements which have corresponding elements in the structure of the above-mentioned copending application of Alan G. Loofbourrow but it is characterized by a new and improved means for regulating the operating position of the manually operable selector lever.

It is a principal object of my present invention to provide an improved gearshift mechanism of the type referred to above wherein the manually operable selector lever is spring biased into engagement with one side of the elongated gate opening to facilitate the engagement of the selector lever with the stops.

A further object of my invention is to provide an improved gearshift mechanism of the type previously mentioned wherein means are provided for pivotally mounting the novel selector lever for movement with a minimum amount of resistance about a pivotal axis.

It is a further object of my invention to provide an improved gearshift mechanism as set forth in the preceding object wherein means are also provided for normally urging the selector lever in the direction of the pivotal axis and into engagement with one side of the elongated selector gate opening in the dash.

Other objects and features of my invention will readily become apparent from the following description and from the accompanying drawings wherein:

Figure 1 is an assembly view showing the principal components of the linkage mechanism of my instant invention together with the dash structure and a portion of the transmission assembly of a typical automotive vehicle;

Figure 2 is a detail plan view of the lower portion of the linkage mechanism shown in Figure 1;

Figure 3 is an enlarged view of the upper portion of the linkage mechanism shown in Figure 1;

Figure 4 is an outside view of the surface of the cover for the interior dash structure as viewed in the direction indicated by arrow B in Figure 3;

Figure 5 is a detail cross sectional view of a portion of the gear shift linkage mechanism shown in Figure 1 and is taken along section line 5—5 of Figure 3;

Figure 6 is a detail view partly in cross section showing a means for mounting a portion of the linkage mechanism of Figure 1 to the vehicle engine and transmission assembly and is taken along section line 6—6 of Figure 1;

Figure 7 is an enlarged view of that portion of the linkage mechanism in Figure 1 situated at the upper side of the vehicle engine compartment;

Figure 8 is a plan view of the portion of the linkage mechanism shown in Figure 7 and is viewed along the plane indicated by section line 8—8 of Figure 1; and Figure 9 is a detail view partly in cross section of a portion of the linkage structure shown in Figure 8 and is taken along section line 9—9 of Figure 8.

Referring first to the assembly view of Figure 1, I have illustrated the linkage mechanism of my instant invention in combination with the engine and transmission assembly of a conventional automotive vehicle, the latter comprising an engine 10 and a power transmitting mechanism contained within the transmission housing 12 which may be bolted to the rear end of the engine 10 to form a unitary assembly. The gear shift mechanism of my instant invention is particularly adapted to be used with automatic transmissions of known construction in which any of a plurality of gear reduction ratios within a given drive range may be obtained automatically and wherein a shift from one drive range to another may be obtained by movement of a suitable control element such as a hydraulic pressure distribution valve element. In the transmission 12 illustrated in Figures 1 and 2 this shift control element may be positively connected to the lever 14, the latter having an extension with an eyelet 16 formed at the terminal portion thereof to facilitate a positive driving connection with a substantially rearwardly extending linkage element 18. The other end of the linkage element 18 may be connected to a substantially vertical shaft element 20 by a coupling means best shown in the detail view of Figure 6.

As seen in Figure 6, the engine and transmission assembly may include a mounting flange 22 to which is secured a supporting bracket 24 by means of a bolt 26, said bracket 24 including a substantially horizontal extension 27 with an aperture 28 formed therein as shown. The shaft 20 may be received through the opening 28 and a suitable nylon bushing or the like may be received within the opening 28 about the shaft 20 as shown at 30 to accommodate relative rotation between the shaft 20 and the bracket 24. A resilient grommet 32 may also be received through the opening 28 about the bushing 30 to insulate the relatively movable linkage and bracket portions. A washer 34 may be received over the shaft 20 and positioned on the upper side of the bushing 30 and another pair of washers 36 may be received over the lower end of the shaft element 20 and positioned below the horizontal bracket portion 36 and the grommet 32. The entire assembly may be held in place by a pin 38 extending through a transverse opening in the end of the shaft element 20 as shown.

A linkage arm 40 may be welded or otherwise fixed to the lower portion of the shaft element 20 and may extend transversely to the axis of the shaft 20 for a convenient distance, the terminal end of the arm 40 being formed with an eyelet 42 within which is received a flexible grommet 44. The end of the linkage element 18 may be bent at right angles and may be received through the grommet 44 to provide a driving connection between the arm 40 and the linkage element 18.

Referring next to Figures 7 and 8, the upper portion of the shaft element 20 is received through an opening 46 formed in a substantially horizontal extension 48 of a supporting bracket generally designated by numeral 50, said bracket further including a right angle portion 52 which may be bolted by a suitable bolt 54 to the side of the engine fire wall 56 within the vehicle engine compartment. A suitable backup plate 58 may be positioned on the other side of the fire wall 56 to provide added support to the bracket 50. A flexible grommet 60 may be positioned within the opening 46 and the upper end of the shaft element 20 may be received through the grommet 60 to provide a resilient end support for the same.

The details of the connection between the shaft element 20 and the arm extension 48 may best be observed in Figure 9. Also, as best seen in Figure 9, a nylon bushing 61 may be received within the flexible grommet 60 about the shaft element 20 to accommodate both an axial shifting movement and a rotary movement with respect to the shaft element 20. An arm 62 may be welded or otherwise secured to the upper portion of the shaft element 20 and it may include a first horizontal portion 64 having an opening for receiving the upper end of the shaft element 20 and a second horizontal portion 66 having an eyelet 68. An adaptor 70 of substantially cylindrical configuration may be formed with a central opening 72 and it may include a radial extension 74 which may be received through the eyelet 68 to provide a positive driving connection between the adaptor 70 and the arm 62. Washers 76 and 78 may be received over the extension 74 and positioned on the upper and lower sides respectively of the horizontal portion 66 of the arm 62. The adaptor 70 may be retained in place by a pin 80 received through a transverse opening in the end of the extension 74 as indicated in Figure 7.

A substantially horizontal linkage element 82 may be formed with the threaded end extending through the opening 72 of the adaptor 70 and nut elements 84 and 86 may be threadably received on the end of the linkage element 82 and positioned on either side of the adaptor 70. The linkage element 82 may be adjusted with respect to the adaptor 70 by rotating the nuts 84 and 86 with a suitable hand tool or the like. The linkage element 82 extends through an enlarged opening 88 formed in the fire wall 56 and a flexible rubber boot 90 or other shielding means may be received at one end thereof within the opening 88 and disposed about the linkage element 82 at the other end thereof to prevent dirt or other foreign matter from entering the passenger compartment from the engine compartment through the opening 88.

The shaft element 20 may be caused to vibrate and to shift in an axial direction by reason of the engine vibration transmitted thereto by the engine transmission assembly upon which it is mounted. This vertical movement will be accompanied by a sliding movement of the upper end of the shaft element 20 within the nylon bushing 61 shown in Figure 9. This movement will also be accompanied by a vertical displacement of the arm 62 and the threaded end of the linkage element 82. However, the opening 88 is sufficiently large to accommodate a considerable degree of displacement of the linkage element 82 during operation and the boot 90 may readily be deformed accordingly.

The other end of the linkage element 82 extends within the interior of the passenger compartment and is formed with a right angle extension which is received through an eyelet 92 formed in the end of a lever 94. As best seen in Figure 5, a grommet 96 is received through the eyelet opening 92 and a bushing 98 is received through the center of the grommet 96, said bushing 98 receiving the end of the linkage element 82 and accommodating relative movement between the same and the lever 94. Washers 100 and 102 may be positioned on opposite sides of the grommet 96 and the end of the linkage element 92 may be retained within the bushing 98 by a cotter clip 104 or by any other suitable fastening means.

The lever 94 may be pivoted at the other end thereof upon a fixed anchor member 106, said other end being provided with aligned openings 108 and 110 for the purpose of receiving the anchor member 106. A cylindrical nylon bushing 112 may be received through the openings 108 and 110 and disposed about the anchor member 106, said bushing providing a substantially frictionless bearing support for the lever 94.

The anchor member 106 may be carried by an arm 114 which forms an extension of a dash-mounted bracket 116 as best seen in Figure 3. The arm extension 114 may be apertured at 118 to receive the anchor member 106, and the head 120 of the anchor member 106 may be welded or otherwise secured to the bracket arm extension 114 about the periphery of the aperture 118 as shown. The other end of the anchor member 106 receives a washer 122 which may be held in place by a clip 124 or other suitable fastening means carried by the end of the anchor member 106. A compression spring 126 is interposed between the washer 122 and the lever 94 with one end thereof being seated on the end of the nylon bushing 112. By preference, the spring 126 is conical in shape with the larger end thereof being seated on the washer 122.

The bracket 116 comprises a main body portion 128 having flanged edges 130 and 132 to provide added structural support. One portion of the flanged edge 130 may be bolted to a structural member 134 of the vehicle dash structure by means of a bolt 136. A lightening hole 138 and a reinforcing rib 140 may also be provided on the bracket body portion 128 as indicated in Figure 1. The cover for the vehicle dash structure is indicated by numeral 142 and it is formed with an elongated opening 144 as best seen in Figure 4. One edge of the opening 144 may be formed with a pair of spaced tabs which in turn may be bent at right angles to the surface of the cover 142 as indicated at 146 and 148, said tabs being apertured to receive therethrough the bolts 150 and 152 respectively. The upper end of the bracket 116 is also apertured as shown at 154 and 156 and may be clamped to the tabs 146 and 148 by means of the bolts 150 and 152, the latter being received through the openings 154 and 156 respectively. A cover plate 158 may be positioned over the dash opening 144 and it may comprise an elongated slot 160 which is coincident with the elongated opening 144. The slot 160 is comprised of three sections shown at 162, at 164 and at 166, the section 164 being greater in width than the two adjacent sections 162 and 166. By preference a nylon lining 168 may be formed about the entire periphery of the elongated opening 160.

The manually operable selector lever arm 170 may be fixed to the lever 94 at an intermediate portion thereof as indicated in Figures 3 and 5, and it may extend in a generally upward direction toward the dash cover 142. An extension 172 may be fixed to the end of the arm 170 by rivets or other suitable fastening means as shown at 174 and 176. The selector arm extension 172 extends through the elongated opening 160 so as to make the same accessible to the vehicle operator, said extension being provided with a suitable knob 178, as shown in Figure 1, to provide for convenient actuation of the selector lever.

It will be apparent that the cover plate 168 positioned on the dash cover 142 will function as a control gate for regulating the position of the selector lever which extends therethrough. When the selector lever moves to position L as shown in Figure 4, the lever 94 is caused to pivot in a clockwise direction as viewed in Figure 1, which in turn causes the shaft element 20 to rotate about its axis by reason of the positive connection between the same and the lever 94 which is provided by the link element 82 and the arm 62. This rotary movement of the shaft element 20 causes a forward shifting movement of the link element 18 which will rotate the transmission shift control valve lever 14 to cause the transmission to shift in the low drive range.

As the selector lever is moved to position D as indicated in Figure 4, it will be apparent that the lever 94 will be shifted in a counterlockwise direction thereby causing a reverse shifting movement of the valve actuator lever 14 which causes the transmission to shift into the drive range. Similarly, the transmission may be shifted into neutral by moving the selector lever to the uppermost position N within the gate section 164. Also the transmission may be shifted into reverse drive range by moving the selector lever 170 to the position R within the gate section 162.

In moving from either the gate section 166 or 162 into the intermediate gate section 164, the selector lever is biased into engagement with the nylon lining for the opening 160 by the spring 126 situated above the anchor member 106. In moving from the intermediate gate section 164 to either of the sections 162 or 166, the selector lever may be conveniently shifted in a left hand direction as viewed in Figure 4 by the vehicle operator against the opposing spring force exerted by spring 126 by reason of the substantially frictionless bushing 124.

The improved construction of the selector lever and the novel means for pivotally mounting the same on the vehicle dash structure results in more uniform operation and considerably less shifting effort is required by the vehicle operator in changing the transmission driving range. The spring associated with the pivot mounting structure for the selector is effective to gently urge the lever into engagement with the side of the gate opening and this spring pressure may be overcome merely by applying finger tip pressure to the end of the selector lever. Since a deflection of the body of the selector lever is not required, the bearing loads on the nylon bushing associated with the lever mounting structure and axial loads on the anchor pin are of a negligible value and friction is reduced for this reason.

Having thus described a preferred embodiment of the gearshift mechanism of my instant invention, what I claim and desire to secure by United States Letters Patent is:

1. In a wheeled vehicle having a power plant, a multiple speed reduction ratio transmission for transmitting driving power from the power plant to the vehicle wheels, a passenger compartment, and vehicle dash structure including a control panel disposed within the passenger compartment; linkage means having portions operatively connected to a portion of said transmission for effecting a change in the reduction speed ratio thereof and comprising a manually operable selector lever, a relatively fixed pivot member carried by said dash structure, a nylon bushing disposed about said pivot member, said selector lever being pivotally mounted on said bushing, a gate opening formed in said dash control panel with abutment shoulders formed on one edge thereof, said selector lever extending through said gate opening, and a spring element disposed at one side of said lever in the vicinity of said pivot member for urging said lever into engagement with said one edge of said gate opening, the abutment shoulders on the latter being effective to define a plurality of angular positions of said lever with respect to the pivotal axis thereof.

2. The combination as set forth in claim 1 wherein said gate opening is characterized by a nylon lining capable of reducing friction between the sides of the gate opening and the selector lever.

3. In an automotive vehicle comprising a frame, a multiple speed power transmission mechanism and engine assembly having a plurality of operating speed ranges, a control means for selectively obtaining any of said operating ranges, and body structure supported by said frame including dash panel structure disposed within the interior of said body structure; a transmission operating range selector lever, means for pivotally mounting said selector lever on said dash panel structure including a pivot member and a nylon bushing disposed about said pivot member, said selector lever being supported on said bushing, linkage means interconnecting said selector lever and a portion of said control means for actuating the latter, and spring means for biasing said selector lever substantially in the direction of the pivotal axis thereof.

4. The combination as set forth in claim 3 wherein said spring means comprises a tapered spring, said spring encircling the pivotal axis of said selector lever with the smaller end thereof engaging said bushing for urging the same in the direction of said pivotal axis.

5. In an automotive vehicle comprising a frame, a multiple speed power transmission mechanism and engine assembly having a plurality of operating speed ranges, a control means for selectively obtaining any of said operating ranges, and body structure supported by said frame including dash panel structure disposed within the interior of said body structure; a transmission operating range selector lever, a relatively fixed pivot member carried by said dash structure, said selector lever being pivotally mounted on said member and slidable thereon axially of its pivotal axis, and spring means biasing said selector lever substantially in one direction along said axis.

6. In an automotive vehicle comprising a frame, a multiple speed power transmission mechanism and engine assembly having a plurality of operating speed ranges, a control means for selectively obtaining any of said operating ranges, and body structure supported by said frame including dash panel structure disposed within the interior of said body structure; a transmission operating range selector lever, a relatively fixed pivot member carried by said dash structure, said selector lever being pivotally mounted on said member and slidable thereon axially of its pivotal axis, a bushing interposed between said pivot member and a portion of said selector lever and supporting the latter for pivotal and axially sliding movement, and spring means biasing said selector lever substantially in one direction along said axis.

7. In an automotive vehicle comprising a frame, a multiple speed power transmission mechanism and engine assembly having a plurality of operating speed ranges, a control means for selectively obtaining any of said operating ranges, and body structure supported by said frame including dash panel structure disposed within the interior of said body structure; a transmission operating range selector lever, means for pivotally mounting said selector lever on said dash panel structure including a pivot member and a bushing member, said bushing member being interposed between said pivot member and a portion of said lever and supporting the latter for pivotal and axially sliding movement, linkage means interconnecting said selector lever and a portion of said control means for actuating the latter, and spring means for biasing said selector lever substantially in the direction of the pivotal axis thereof.

References Cited in the file of this patent

UNITED STATES PATENTS

| | | |
|---|---|---|
| 1,793,010 | Randol | Feb. 17, 1931 |
| 2,136,751 | Nampa | Nov. 15, 1938 |
| 2,191,543 | Osborne | Feb. 27, 1940 |